(12) United States Patent
Moriyama et al.

(10) Patent No.: US 10,084,980 B2
(45) Date of Patent: Sep. 25, 2018

(54) SOLID-STATE IMAGE SENSOR AND CAMERA

(71) Applicant: CANON KABUSHIKI KAISHA, Tokyo (JP)

(72) Inventors: Takashi Moriyama, Yokohama (JP); Kazuaki Tashiro, Isehara (JP); Tatsuhito Goden, Machida (JP); Toshiaki Ono, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 390 days.

(21) Appl. No.: 15/070,351

(22) Filed: Mar. 15, 2016

(65) Prior Publication Data

US 2016/0295140 A1    Oct. 6, 2016

(30) Foreign Application Priority Data

Mar. 30, 2015  (JP) ................. 2015-069808

(51) Int. Cl.
*H04N 5/369* (2011.01)
*H04N 5/378* (2011.01)
*H04N 5/374* (2011.01)
*H04N 5/3745* (2011.01)

(52) U.S. Cl.
CPC .......... *H04N 5/3698* (2013.01); *H04N 5/378* (2013.01); *H04N 5/3745* (2013.01)

(58) Field of Classification Search
None
See application file for complete search history.

(56) References Cited

U.S. PATENT DOCUMENTS

| 5,923,830 | A | * | 7/1999 | Fuchs ................ G06F 11/1641 714/11 |
| 6,717,151 | B2 | | 4/2004 | Tashiro et al. |
| 7,787,037 | B2 | | 8/2010 | Ono et al. |
| 7,817,199 | B2 | | 10/2010 | Yamashita et al. |
| 7,852,107 | B1 | * | 12/2010 | Sundararajan ... H03K 19/00338 326/10 |
| 7,986,353 | B2 | | 7/2011 | Ono |

(Continued)

FOREIGN PATENT DOCUMENTS

| JP | 2006-350425 | 12/2006 |
| WO | 2002/042797 A1 | 5/2002 |

OTHER PUBLICATIONS

Kazuaki Tashiro et al., U.S. Appl. No. 15/064,805, filed Mar. 9, 2016.

*Primary Examiner* — Dennis Hogue
(74) *Attorney, Agent, or Firm* — Fitzpatrick, Cella, Harper & Scinto

(57) ABSTRACT

A solid-state image sensor includes an image sensing unit in which a plurality of pixels are arrayed, a plurality of readout units configured to read out signals from the image sensing unit, a detector configured to detect an occurrence of a latch-up in each of the plurality of readout units, and a controller configured to control power supply to the plurality of readout units. The plurality of readout units are configured to read out signals from a same pixel in the image sensing unit. The controller is configured to shut off power supply to at least part of a readout unit in which the occurrence of the latch-up has been detected out of the plurality of readout units and thereafter supply power to the at least part.

19 Claims, 11 Drawing Sheets

(56) References Cited

U.S. PATENT DOCUMENTS

| | | |
|---|---|---|
| 8,085,319 B2 | 12/2011 | Ono et al. |
| 8,670,049 B2 | 3/2014 | Ono et al. |
| 8,675,107 B2 | 3/2014 | Yamashita et al. |
| 8,810,705 B2 | 8/2014 | Ono |
| 8,860,858 B2 | 10/2014 | Ono |
| 9,025,041 B2 | 5/2015 | Ono |
| 9,025,059 B2 | 5/2015 | Tashiro |
| 9,093,340 B2 | 7/2015 | Ono |
| 9,261,769 B2 | 2/2016 | Tashiro et al. |
| 2015/0009385 A1 | 1/2015 | Tsukida et al. |
| 2015/0077605 A1 | 3/2015 | Takada et al. |
| 2015/0130978 A1 | 5/2015 | Tashiro et al. |
| 2015/0215562 A1 | 7/2015 | Tashiro |

\* cited by examiner

SOLID-STATE IMAGE SENSOR AND CAMERA

BACKGROUND OF THE INVENTION

1. Field of the Invention

The present invention relates to a solid-state image sensor and a camera incorporating the solid state image sensor.

2. Description of the Related Art

When high-energy particles enter a solid-state image sensor, a single-event latch-up (SEL) can occur. The cosmic rays in outer space and radiation in a nuclear power plant or radiation image diagnosis can be raised as examples of high-energy particles. An SEL can occur, for example, in a thyristor structure in which pn junctions are connected in series in a CMOS structure. If an SEL occurs, the power source line and the ground line become conductive, and the operation of an apparatus that lacks a safeguard is disabled by the occurrence of the SEL. Therefore, when an SEL occurs, it becomes necessary to temporarily shut off the power supply to an apparatus and later restart the power supply.

Japanese Patent Laid-Open No. 2006-350425 relates to a semiconductor device that is used in a radioactive environment. The semiconductor device includes a detection unit that detects the occurrence of an SEL and a compensating circuit that turns on/off the power supply in accordance with the detection result. International Publication No. 2002/042797 relates to a radiation image diagnosis apparatus. The radiation image diagnosis apparatus has a function that monitors the supply of power to each of a plurality of element blocks, stops the supply of power to an ASIC which processes the signals from the plurality of blocks when an abnormality is detected, and corrects the data based on the duration of the time in which the supply of power was stopped.

In an arrangement which temporarily shuts off, when a latch-up occurs in a solid-state image sensor, power supply to the solid-state image sensor and later restarts the power supply, an image cannot be obtained during a power supply shutoff period. In the case of moving image sensing, an image may become unobtainable over a period of several frames.

SUMMARY OF THE INVENTION

The present invention provides a solid-state image sensor that has an arrangement advantageous in reducing a period in which an image cannot be obtained.

One of the aspects of the present invention provides a solid-state image sensor that includes an image sensing unit in which a plurality of pixels are arrayed, the sensor comprising: a plurality of readout units configured to read out signals from the image sensing unit; a detector configured to detect an occurrence of a latch-up in each of the plurality of readout units; and a controller configured to control power supply to the plurality of readout units, wherein the plurality of readout units are configured to read out signals from a same pixel in the image sensing unit, and the controller is configured to shut off power supply to at least part of a readout unit in which the occurrence of the latch-up has been detected out of the plurality of readout units and thereafter supply power to the at least part.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

Figure 1:
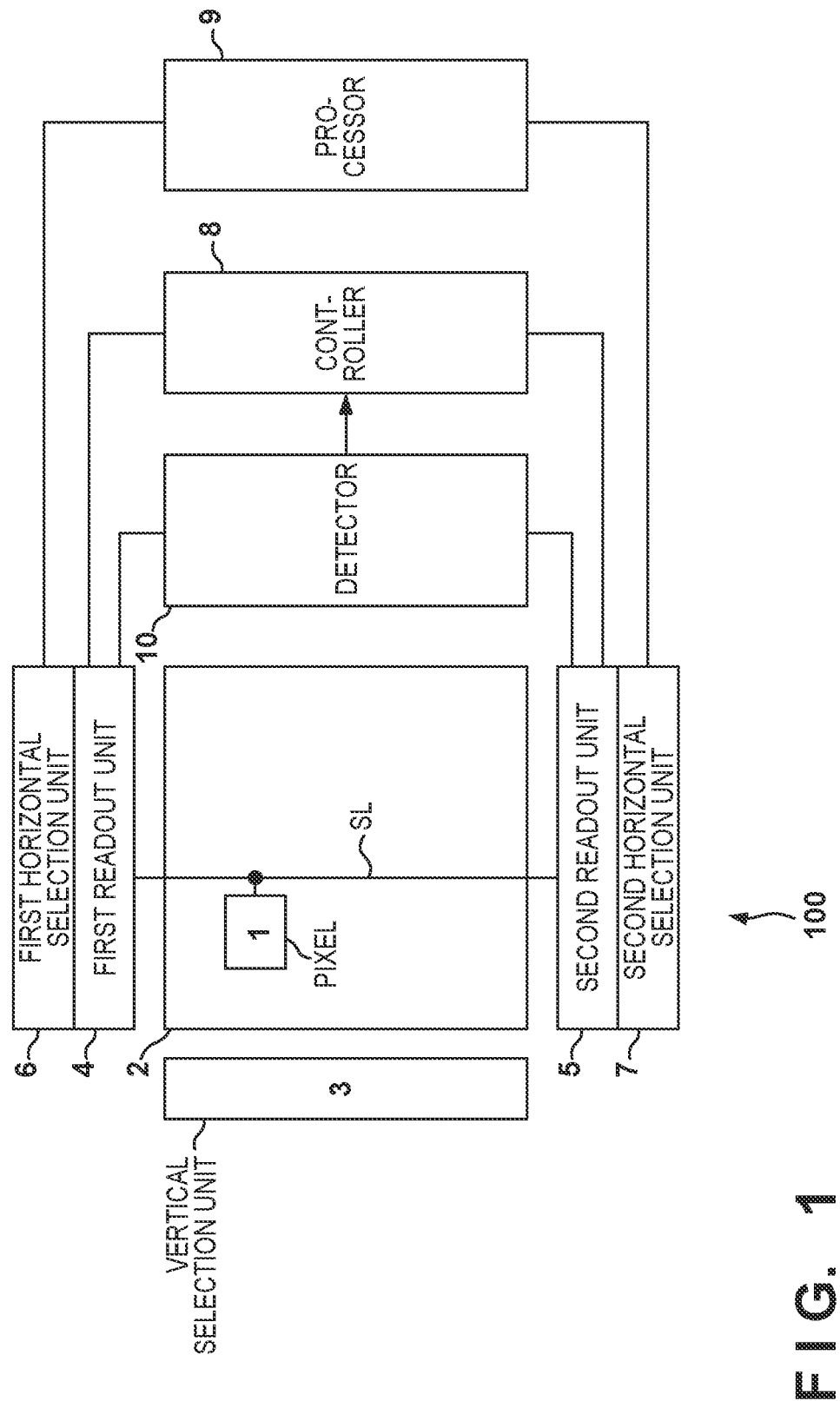
FIG. 1 is a view showing the arrangement of a solid-state image sensor according to the first embodiment of the present invention.

FIG. 1 shows the arrangement of a solid-state image sensor 100 according to the first embodiment of the present invention. The solid-state image sensor 100 includes an image sensing unit (or an image sensing area) 2 in which a plurality of pixels 1 are arrayed. The pixels 1 are arrayed so as to form a plurality of rows and a plurality of columns. FIG. 1 only shows one representative pixel 1 for the sake of descriptive convenience. Each pixel 1 (specific details will be described below) can include a photoelectric converter and an amplification transistor which outputs a signal according to charges generated by the photoelectric converter.

The solid-state image sensor 100 includes a vertical selection unit 3 for selecting a row of the image sensing unit, a first readout unit 4 and a second readout unit 5 which are examples of a plurality of readout units (or readout circuits) for reading out signals from the image sensing unit 2. The first readout unit 4 can be arranged on one side of the image sensing unit 2 and the second readout unit 5 can be arranged on the other side of the image sensing unit 2. In other words, the image sensing unit 2 can be arranged between the first readout unit 4 and the second readout unit 5.

Although only the first readout unit 4 and the second readout unit 5 are provided as the plurality of readout units in FIG. 1, the solid-state image sensor 100 can further include more readout units. The solid-state image sensor 100 also includes a first horizontal selection unit 6 and a second horizontal selection unit 7 as a plurality of horizontal selection units for selecting a column. Typically, one horizontal selection unit is provided per one readout unit. The first horizontal selection unit 6 selects and outputs, in a preset order, signals of one row of pixels 1 read out from the image sensing unit 2 by the first readout unit 4. The second horizontal selection unit 7 selects and outputs, in a preset order, signals of one row of pixels 1 read out from the image sensing unit 2 by the second readout unit 5.

The first readout unit 4 and the second readout unit 5 as the plurality of readout units are formed to be capable of reading out a signal from the same pixel 1 in the image sensing unit 2. The first readout unit 4 and the second readout unit 5 as the plurality of readout units can be formed to be capable of simultaneously reading out the signals from the same pixel 1 or reading out the signals at different timings from each other. Since, according to this kind of an arrangement, signals can be read out from the image sensing unit 2 by another readout unit if a latch-up occurs and power supply is temporarily shut off from the current readout unit, a period in which an image is unobtainable can be reduced.

Each of the first readout unit 4 and the second readout unit 5 as the plurality of readout units can include, for example, a current source, a column amplifier, and an A/D converter (analog/digital converter). The current source which can form each readout unit is connected to a signal line SL (column signal line) connected to pixels 1 and can be formed to flow a current (typically, a constant current) to the signal line SL. A source-follower circuit can be formed by an amplification transistor and the current source of each pixel 1. The column amplifier can be formed to amplify the signal output from each pixel 1 to the signal line SL.

In the arrangement shown in FIG. 1, the solid-state image sensor 100 includes a plurality of signal lines SL (only one of which is shown). Signals of the pixels 1, out of the plurality of pixels 1 forming the image sensing unit 2, belonging to one column are output to the signal line SL, out of the plurality of signal lines SL, corresponding to the column. The plurality of signal lines SL are connected to the plurality of readout units, respectively.

The A/D converter which can form the readout unit converts each signal (analog signal) output to the corresponding signal line or each signal output from the column amplifier, if a column amplifier has been provided, into a digital signal. The A/D converter can include, for example, a comparator, a counter, and a memory. The comparator can compare each analog signal to be converted into a digital signal with a reference signal such as a ramp signal and outputs a signal indicating the timing in which the magnitude relationship between the analog signal and the reference signal has been inverted. The period from the start of the comparison operation by the comparator and the inversion of the magnitude relationship of the analog signal and the reference signal corresponds to the value of the analog signal. The memory responds to the latch signal output from the comparator and receives a count value from the counter. This count value is the digital signal corresponding to the analog signal.

The A/D converter is typically a CMOS circuit formed from an NMOS transistor and a PMOS transistor and is arranged in accordance with the arrangement pitch of the pixels 1. In this case, the transistors forming the A/D converter can be arranged at a high degree of integration. Therefore, the A/D converter is a circuit in which a latch-up can be easily caused by the incidence of high energy rays.

The solid-state image sensor 100 further includes a detector 10 and a controller 8. The detector 10 can detect the occurrence of a latch-up in each of the first readout unit 4 and the second readout unit 5 as the plurality of readout units. The controller 8 controls power supply to the first readout unit 4 and the second readout unit 5 as the plurality of readout units. The controller 8 can be formed so as to supply, to each of the first readout unit 4 and the second readout unit 5 as the plurality of readout units, a power supply voltage supplied externally from the solid-state image sensor 100. Alternatively, the controller 8 can be formed so as to supply, to each of the first readout unit 4 and the second readout unit 5 as the plurality of readout units, a power supply voltage generated based on a power supply voltage supplied externally from the solid-state image sensor 100. The power supply from the controller 8 to each of the first readout unit 4 and the second readout unit 5 as the plurality of readout units can be individually controlled. The power supply control by the controller 8 can be performed by, for example, shutting off the supply of the power supply voltage or shutting off the current path.

The controller 8 temporarily shuts off the power supply to at least a part of the readout unit in which the occurrence of a latch-up has been detected by the detector 10 out of the first readout unit 4 and the second readout unit 5 as the plurality of readout units. Then the controller 8 supplies power again to the at least part of the readout unit. As a case in which power supply to a part of the readout unit is shut off, for example, a case in which power supply to the A/D converter is shut off while power is supplied to the current source and the column amplifier can be enumerated. Power supply is continued to a readout unit, out of the plurality of readout units, in which the occurrence of a latch-up has not been detected. For example, if a latch-up is detected in the first readout unit 4, power supply to the second readout unit 5 can continue while power supply to at least part of the first readout unit 4 is temporarily shut off.

If no occurrence of a latch-up is detected by the detector 10, the controller 8 can supply power to both of the first readout unit 4 and second readout unit 5 as the plurality of readout units. When power is being supplied to the solid-state image sensor 100, the power can be constantly supplied, via a power supply line (not shown), to the image sensing unit 2, the vertical selection 3, the first horizontal selection unit 6, the second horizontal selection unit 7, the detector 10, the controller 8, and a processor 9. Power can also be constantly supplied, via the power supply line (not shown), to the remaining parts other than the part to which power supply is shut off when a latch-up occurs out of each entire first readout unit 4 and second readout unit 5 when power is being supplied to the solid-state image sensor 100.

Figure 2:
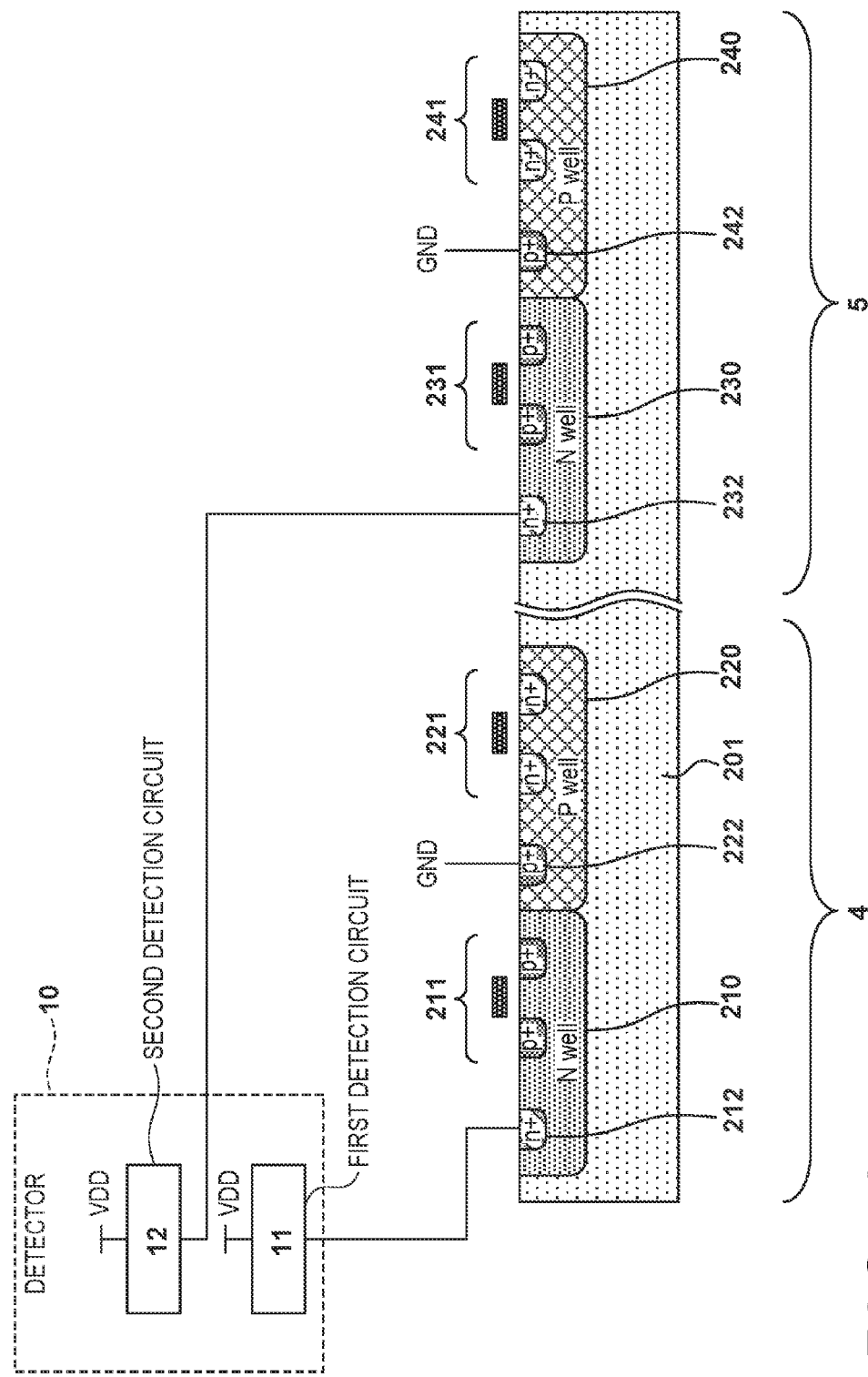
FIG. 2 is a view showing the arrangement of a detector and the principle of detecting an occurrence of a latch-up by the detection unit.

FIG. 2 shows the arrangement of the detector 10 and the principle of detecting a latch-up occurrence by the detector 10. The detector 10 includes a plurality of detection circuits that detect the occurrence of latch-ups in the respective plurality of readout units. The detector 10 includes, for example, a first detection circuit 11 that detects the occurrence of a latch-up in the first readout unit 4 and a second detection circuit 12 that detects the occurrence of a latch-up in the second readout unit 5. The solid-state image sensor 100 is formed on a semiconductor substrate 201.

The first readout unit 4 includes a PMOS transistor 211 formed in an n-well 210 of the semiconductor substrate 201 and an NMOS transistor 221 formed in a p-well 220 of the semiconductor substrate 201. The n-well 210 and the p-well 220 can be arranged in contact with each other. The PMOS transistor 211 formed in the n-well 210 and the NMOS transistor 221 formed in the p-well 220 can be, for example, the transistors forming the A/D converter of the first readout unit 4.

A power supply voltage VDD is supplied to the n-well 210 via a well contact 212 and can be, for example, also supplied to the source of the PMOS transistor 211. The first detection circuit 11 is formed to detect a current flowing from the power supply voltage VDD to the n-well 210. A ground voltage GND is supplied to the p-well 220 via a well contact 222 and can be, for example, supplied to the source of the NMOS transistor 221. If a latch-up occurs in the first readout unit 4, an excessively large current can flow from the power supply voltage VDD to the ground voltage GND via the n-well 210 and the p-well 220. The first detection circuit 11 detects the occurrence of the latch-up in the first readout unit 4 based on, for example, the current flowing from the power supply voltage VDD to the n-well 210, more specifically, by detecting that an excessively large current is flowing from the power supply voltage VDD to the n-well 210. For example, the first detection circuit 11 can be formed to determine whether the current flowing from the power supply voltage VDD to the n-well 210 exceeds a predetermined threshold.

The second readout unit 5 includes a PMOS transistor 231 formed in an n-well 230 of the semiconductor substrate 201 and an NMOS transistor 241 formed in a p-well 240 of the semiconductor substrate 201. The n-well 230 and the p-well 240 can be arranged in contact with each other. The PMOS transistor 231 formed in the n-well 230 and the NMOS transistor 241 formed in the p-well 240 are transistors that form the A/D converter of the second readout unit 5.

The power supply voltage VDD is supplied to the n-well 230 via a well contact 232 and can be, for example also supplied to the source of the PMOS transistor 231. The second detection circuit 12 can be formed to detect a current that flows from the power supply voltage VDD to the n-well 230. The ground voltage GND is supplied to the p-well 240 via a well contact 242 and can be, for example, also supplied to the source of the NMOS transistor 241. If a latch-up occurs in the second readout unit 5, an excessively large current can flow from the power supply voltage VDD to the ground voltage GND via the n-well 230 and the p-well 240. The second detection circuit 12 detects the occurrence of the latch-up in the second readout unit 5 based on, for example, the current flowing from the power supply voltage VDD to the n-well 230, more specifically, by detecting that an excessively large current is flowing from the power supply voltage VDD to the n-well 230. For example, the second detection circuit 12 can be formed to determine whether the current flowing from the power supply voltage VDD to the n-well 230 exceeds a predetermined threshold.

The above-described power supply voltage VDD can be supplied from the controller 8. The first detection circuit 11 can be formed to be capable of detecting latch-ups that could occur in all the parts of the first readout unit 4 or a latch-up that could occur in a circuit in which a latch-up can easily occur such as an A/D converter. In the same manner, the second detection circuit 12 can be formed to be capable of detecting latch-ups that could occur in all the parts of the first readout unit 5 or a latch-up that could occur in a circuit in which a latch-up can easily occur such as an A/D converter.

The solid-state image sensor 100 can further include the processor 9. The processor 9 outputs a signal corresponding to the signal read out by a reading unit, out of the first readout unit 4 and the second readout unit 5 as the plurality of the readout units, excluding the readout unit in which the occurrence of a latch-up was detected by the detector 10, as the signal that was read out from the image sensing unit 2. For example, if the occurrence of a latch-up is detected in the first readout unit 4, out of the first readout unit 4 and the second readout unit 5, by the detector 10, the processor 9 outputs each signal readout by the second readout unit 5 as the signal readout from the image sensing unit 2.

Consider a case in which there are three readout units, readout units A, B, and C, and an occurrence of a latch-up in the readout unit A is detected by the detector 10. In this case, the processor 9 outputs signals corresponding to signals read out by the readout units B and C, excluding the readout unit A, as the signals read out from the image sensing unit 2. For example, the processor 9 can output each signal read out from one of the readout units B and C as the signal read out from the image sensing unit 2. Alternatively, the processor 9 can output a computation result such as the average of signals read out by both of the readout units B and C as the signals readout from the image sensing unit 2.

Figure 3:
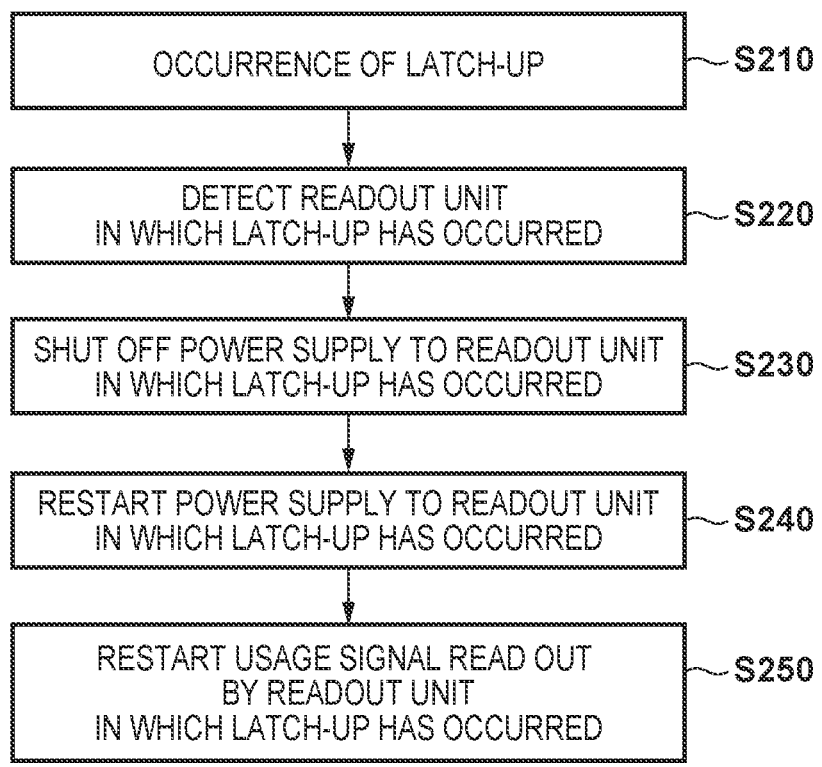
FIG. 3 is a flowchart showing an example of the operation of the solid-state image sensor in a case in which a latch-up has occurred in at least one of a plurality of readout units.

FIG. 3 is a flowchart showing an example of the operation of the solid-state image sensor 100 in a case in which a latch-up occurred in at least one of the plurality of readout units. Assume that a latch-up has occurred in at least one of the plurality of readout units in step S210. In this case, the readout unit in which the latch-up occurred is detected by the detector 10 in step S220. The detection of the readout unit in which the latch-up has occurred can be grasped as the detection of the occurrence of a latch-up in at least one of the plurality of readout units. In step S230, the controller 8 shuts off the power supply to at least part of the reading unit in which the occurrence of the latch-up was detected by the detector 10. Afterwards, in step S240, the controller 8 restarts the power supply to the readout unit in which the power supply was shut off. The timing to restart the power supply is set at a point in which a sufficient period of time has elapsed to eliminate the latch-up. This period of time can be predetermined. Subsequently, in step S250, the processor 9 restarts the usage of signals read out by the readout unit in which power supply was restarted.

During a normal operation time with no occurrence of a latch-up, signals from the pixels 1 of the image sensing unit can be read out by both of the first readout unit 4 and the second readout unit 5 as the plurality of readout units. In this state, for example, if a latch-up occurs in the first readout unit 4 and this is detected by the detector 10 (the first detection circuit 11), the controller 8 shuts off the power supply to at least part of the first readout unit 4. Consequently, the readout operation of signals from the image sensing unit 2 by the first readout unit 4 stops. At this time, the processor 9 can output the signals read out from the image sensing unit 2 by the second readout unit 5. Therefore, even if a latch-up occurs, signals of an image sensed by the image sensing unit 2 are output from the solid-state image sensor 100 (processor 9).

Additionally, during image sensing of a moving image, that is, when image sensing is continuously performed, if a latch-up occurs in at least one of the plurality of readout units, the processor 9 can output a signal corresponding to the signal read out from the other readout units. Therefore, it can solve the problem in which a processing apparatus, which uses the signals output from the solid-state image sensor 100, is unable to receive the signals (image) from the solid-state image sensor for a long period of time.

Figure 4:
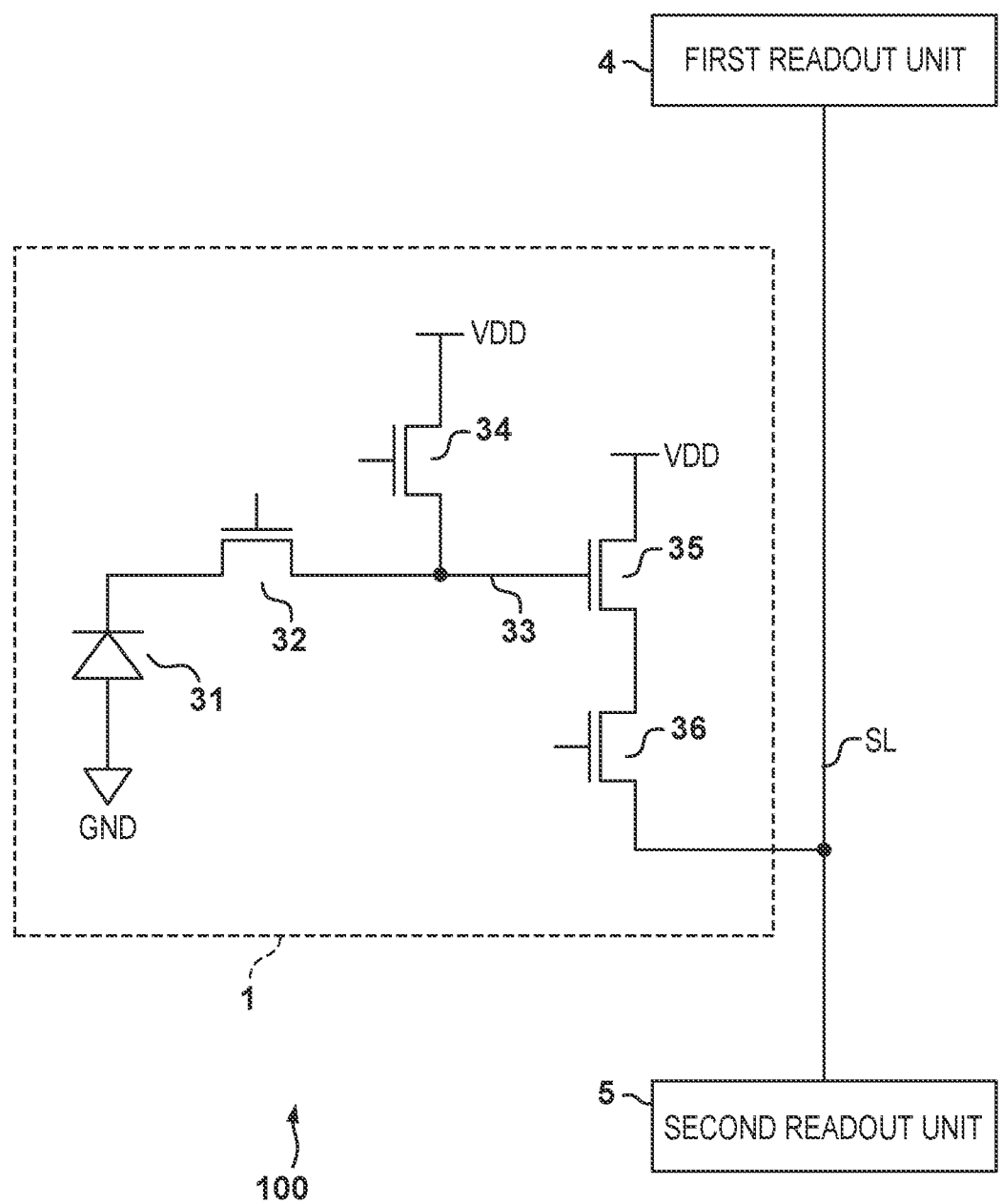
FIG. 4 is a view showing an example of the arrangement of a pixel.

FIG. 4 shows an example of the arrangement of each pixel 1. Each pixel 1 includes at least a photoelectric converter 31. The photoelectric converter 31 can be, for example, a photodiode. The pixel 1 can also include an amplification transistor 35 that outputs a signal according to charges generated by the photoelectric converter 31 to a corresponding signal line SL (column signal line). The pixel 1 can also include a transfer transistor 32 that transfers charges generated and accumulated in the photoelectric converter 31 to a floating diffusion 33 (to be referred to as FD hereinafter) which is an input node of the amplification transistor 35. The pixel 1 can also include a reset transistor 34 that resets the voltage of the FD 33. The pixel 1 can also include a selection transistor 36 for outputting each output from the amplification transistor 35 to the corresponding signal line SL.

Figure 5:
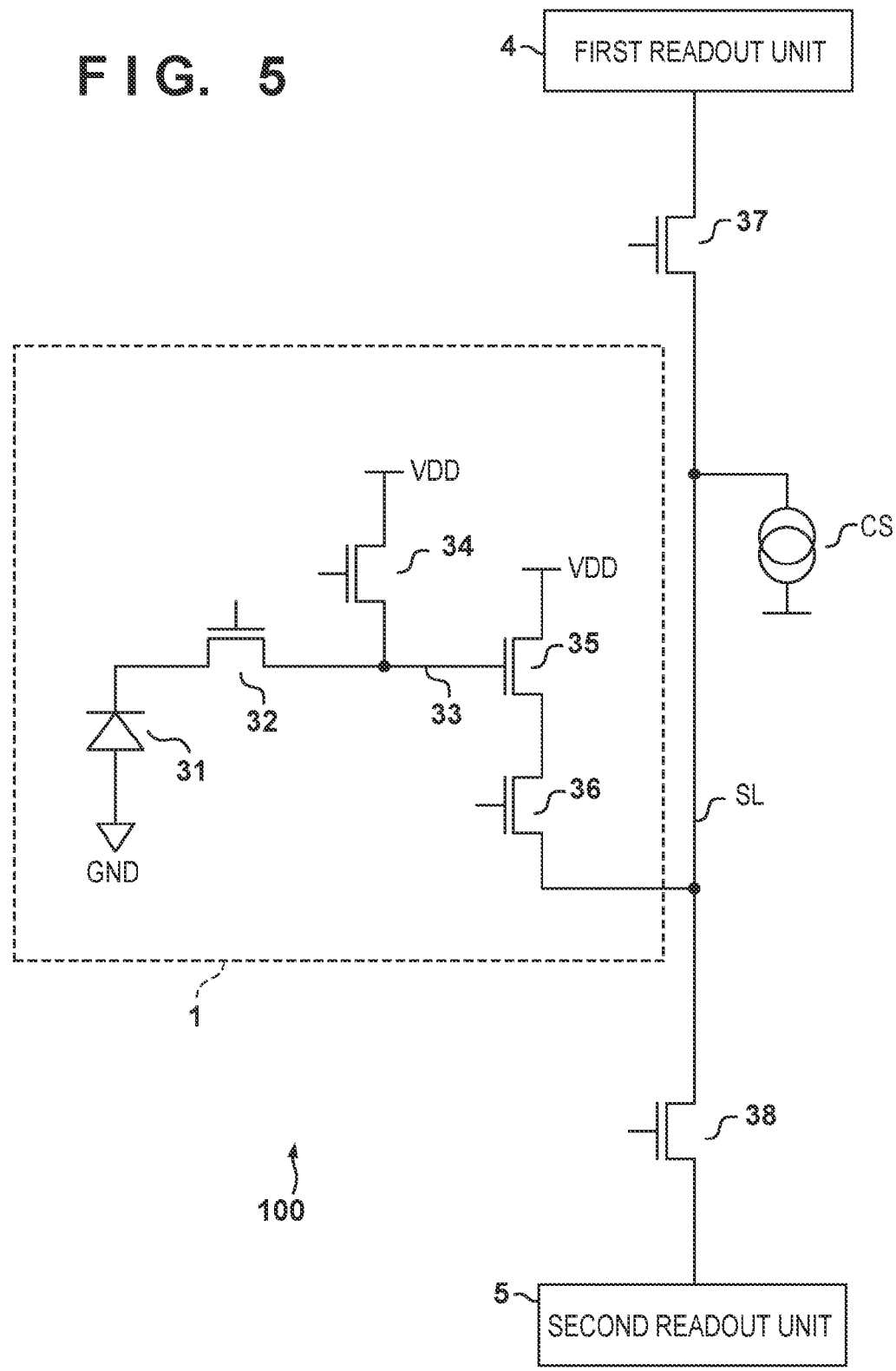
FIG. 5 is a view showing the arrangement of a solid-state image sensor according to the second embodiment of the present invention.

FIG. 5 shows the arrangement of a solid-state image sensor 100 according to the second embodiment of the present invention. Matters not mentioned in the second embodiment can comply with the first embodiment. Descriptions of parts in common with the first embodiment are omitted in FIG. 5. In the second embodiment, a switch 37 is provided between a first readout unit 4 and a signal line SL which is connected to a pixel 1 and a switch 38 is provided between a second readout unit 5 and the signal line SL. A current source CS can be provided on the signal line SL. An amplification transistor 35 and a current source CS can form a source-follower circuit. The current source CS is described as a component different from the first readout unit 4 and the second readout unit 5, but can be grasped as a component of the first readout unit 4 and/or the second readout unit 5. However, assume that power supply to the current source CS is not shut off.

The switches 37 and 38 can be controlled by, for example, a processor 9. Out of the first readout unit 4 and the second readout unit 5 as the plurality of readout units, the readout unit in which power is not supplied from the controller 8 because a latch-up occurred and readout of signals from an image sensing unit 2 cannot be performed is cut off from the signal line SL by turning off a corresponding switch.

Alternatively, during a normal operation time with no occurrence of a latch-up, only one of the switches 37 and 38 can be turned on, and the signals from the image sensing unit 2 can be read out by only one of the first readout unit 4 and the second readout unit 5 as the plurality of readout units. If a latch-up occurs in the readout unit that is performing readout, the switches 37 and 38 are controlled to use another readout unit, and the signals from the image sensing unit 2 can be read out by the other readout unit. That is, the first readout unit 4 and the second readout unit 5 as the plurality of readout units can read out signals from the imaging unit 2 at timings or periods of time different from each other.

Figure 6:
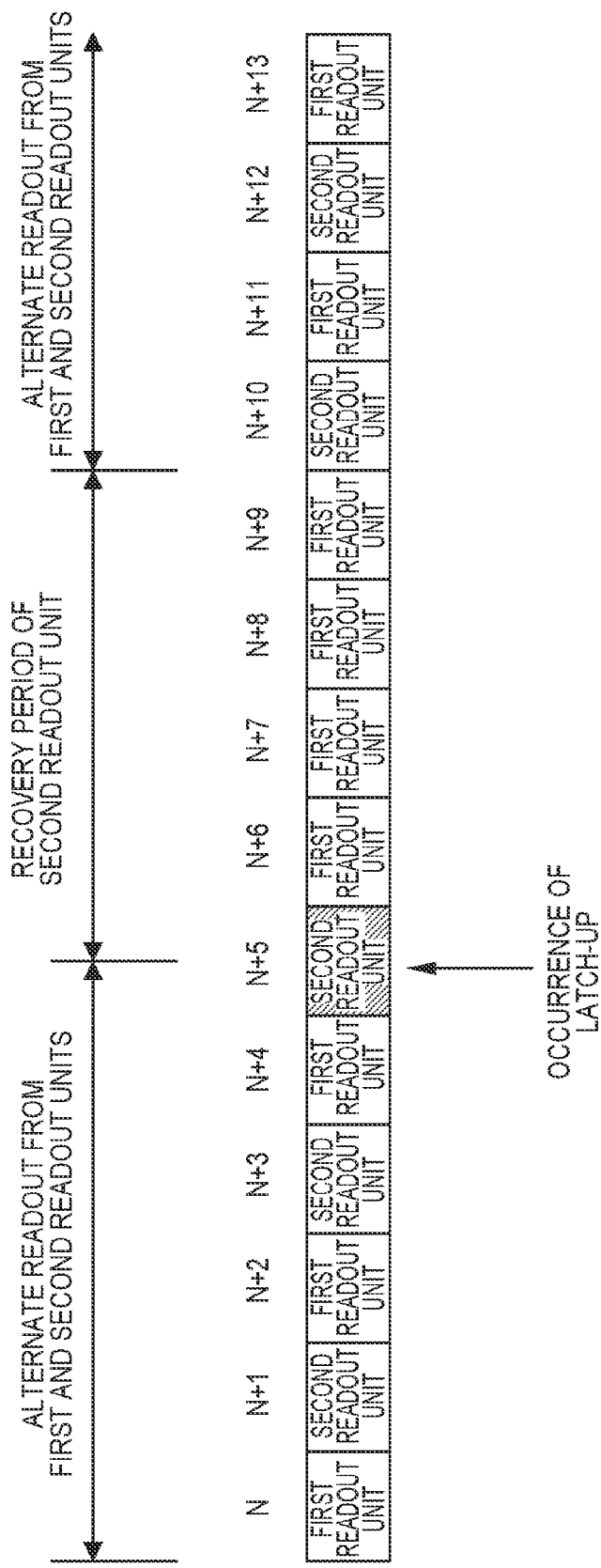
FIG. 6 is a view showing an example of the operation of the solid-sate image sensor according to the second embodiment of the present invention.

FIG. 6 shows an example of obtaining a moving image as the operation example of the solid-state image sensor 100 according to the second embodiment. Assume that the plurality of readout units are formed from only the first readout unit 4 and the second readout unit 5. Nth to (N+13)th denote each frame or period of the frame. In this example, the first readout unit 4 and the second readout unit 5 alternately perform signal readout from the image sensing unit 2 for each frame units until a latch-up occurs. A latch-up occurs in the second readout unit 5 when the second readout unit 5 is performing readout of the image sensing unit 2 in (N+5)th frame. In response to this, the controller 8 temporarily shuts off the power supply to the second readout unit 5 and restarts the power supply to the second readout unit 5 so that the second readout unit 5 can restart the readout by the end of (N+9)th frame. From (N+6)th frame until (N+9)th frame, signals from the image sensing unit 2 are read out by the first readout unit 4, and the processor 9 outputs the signals readout by the first readout unit 4 or signals that have been processed after the readout. In (N+10)th frame and subsequent frames, signal readout from the image sensing unit 2 in frame units is performed alternately by the first readout unit 4 and the second readout unit 5.

In contrast to the above-described operation example, if the plurality of readout units are operating normally, signals of different pixels 1 can be read out by the plurality of readout units. In this case, signals read out by the plurality of readout units can be combined by the processor 9. For example, the plurality of readout units can read out signals from different color pixels. Alternatively, the plurality of readout units can read out signals from pixels of different columns. If a latch-up occurs, the readout unit with no occurrence of a latch-up can read out signals from all of the pixels 1 of the image sensing unit 2.

Figure 7:
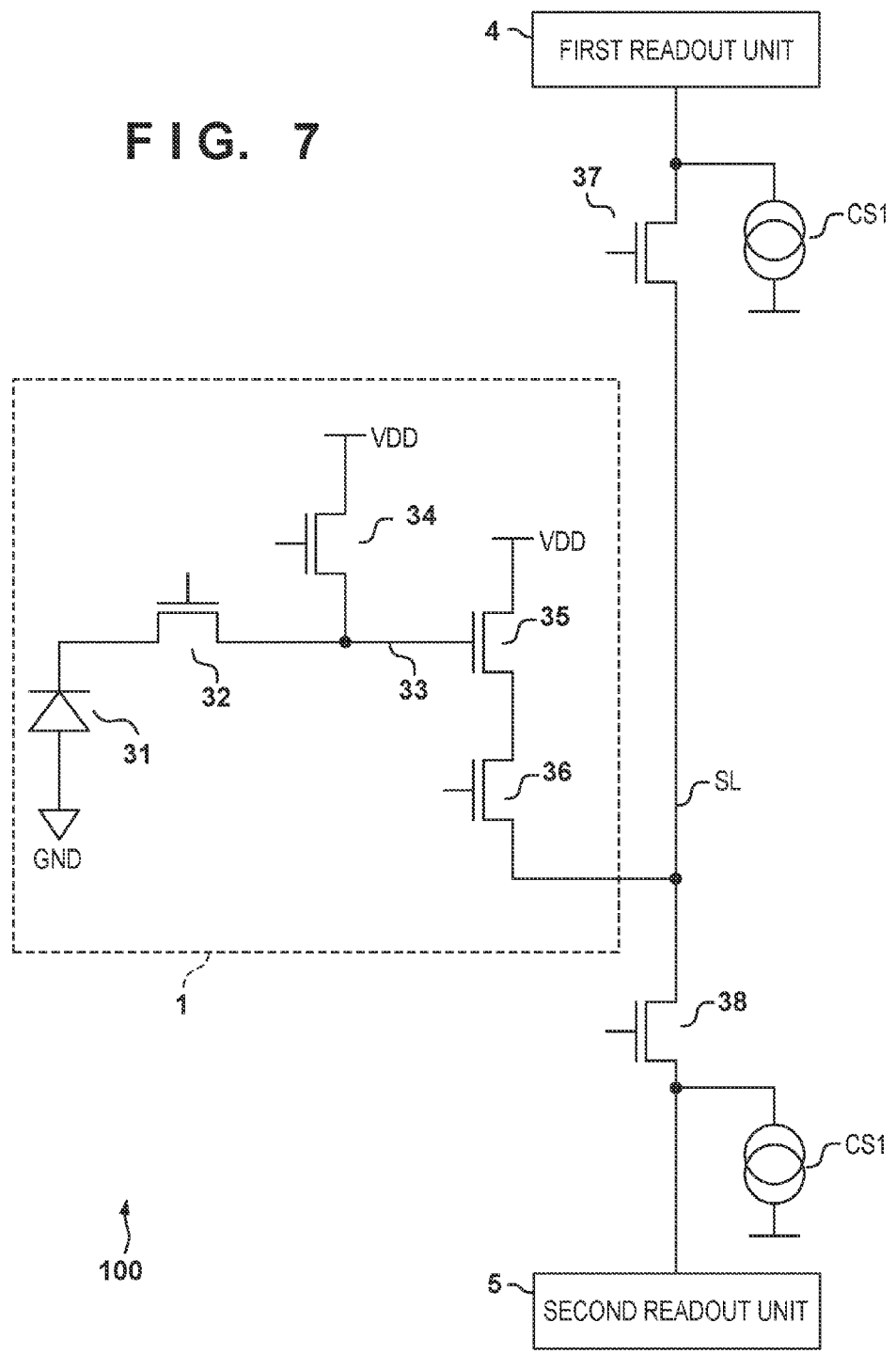
FIG. 7 is a view showing the first modification of the solid-state image sensor according to the second embodiment of the present invention.

FIG. 7 shows the arrangement of the first modification of the solid-state image sensor 100 according to the second embodiment of the present invention. Matters not mentioned in the first modification can comply with the first embodiment or the second embodiment as shown in FIG. 5 which partly incorporates the first embodiment. Descriptions of parts in common with the first embodiment are omitted in FIG. 7. In the first modification, current sources CS1 and CS2 have been provided in place of the current source CS. The current source CS1 is arranged between the switch 37 and the first readout unit 4 and connected to the signal line SL via the switch 37. The current source CS2 is arranged between the switch 38 and the second readout unit 5 and connected to the signal line SL via the switch 38.

Although the current source CS1 is described as a component that is different from the first readout unit 4, it can be grasped as a component of the first readout unit 4. In the same manner, although the current source CS2 is described as a component that is different from the second readout unit 5, it can be grasped as a component of the second readout unit 5.

Figure 8:
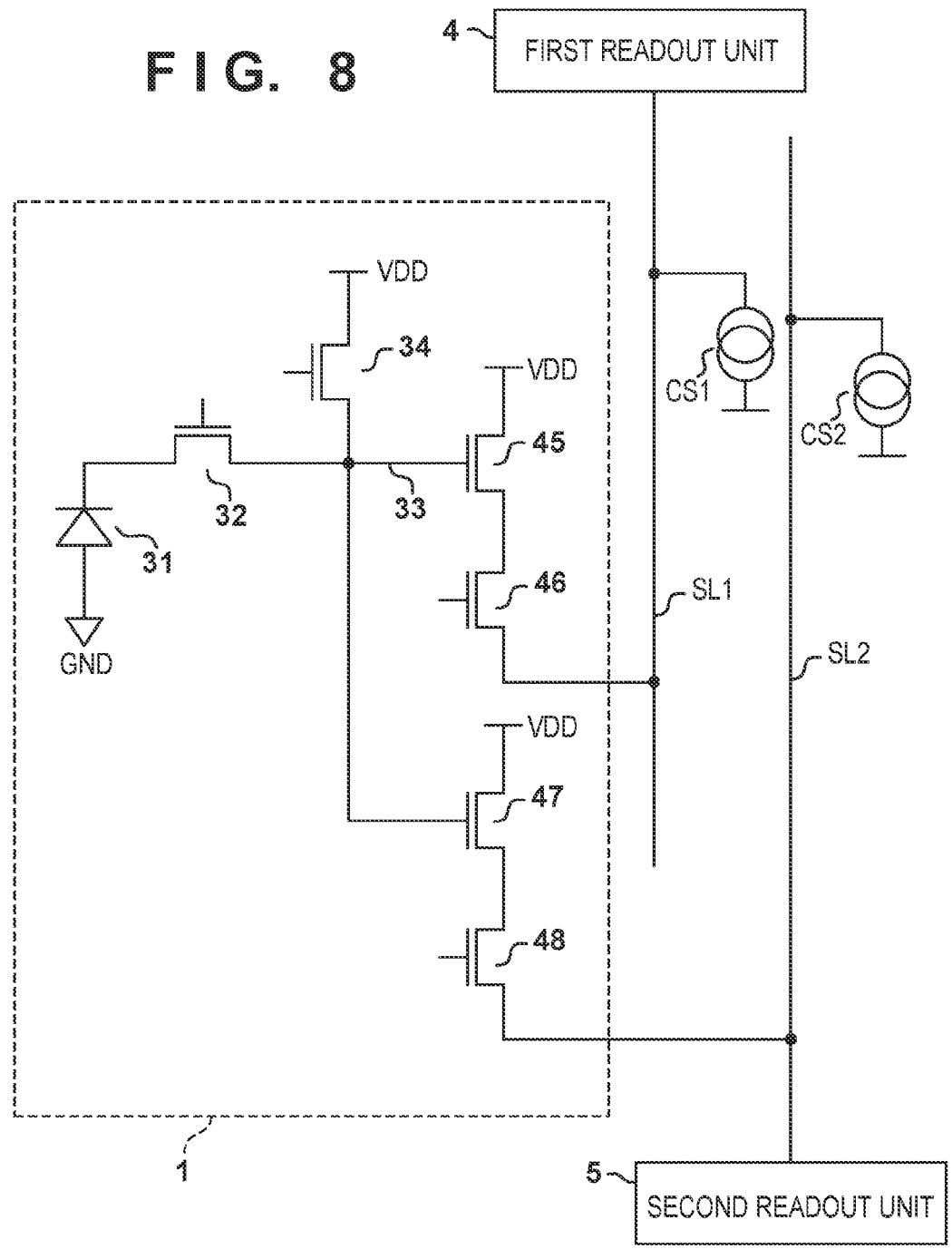
FIG. 8 is a view showing the second modification of the solid-state image sensor according to the second embodiment of the present invention.

FIG. 8 shows the arrangement of the second modification of the solid-state image sensor 100 according to the second embodiment of the present invention. Matters not mentioned in the second embodiment can comply with the first embodiment or the second embodiment shown in FIG. 5 which partly incorporates the first embodiment. Descriptions of parts in common with the first embodiment are omitted in FIG. 8.

In the second modification, each pixel 1 includes a selection transistor 46 and an amplification transistor 45 for signal readout by the first readout unit 4 via a signal line SL1. Additionally, the pixel 1 includes a selection transistor 48 and an amplification transistor 47 for signal readout by the second readout unit 5 via a signal line SL2. When the selection transistor 46 is turned on, the signal of the pixel 1 is output to the signal line SL1 and the output signal is read out by the first readout unit 4. When the selection transistor 48 is turned on, the signal of the pixel 1 is output to the signal line SL2 and the output signal is read by the second readout unit 5.

Figure 9:
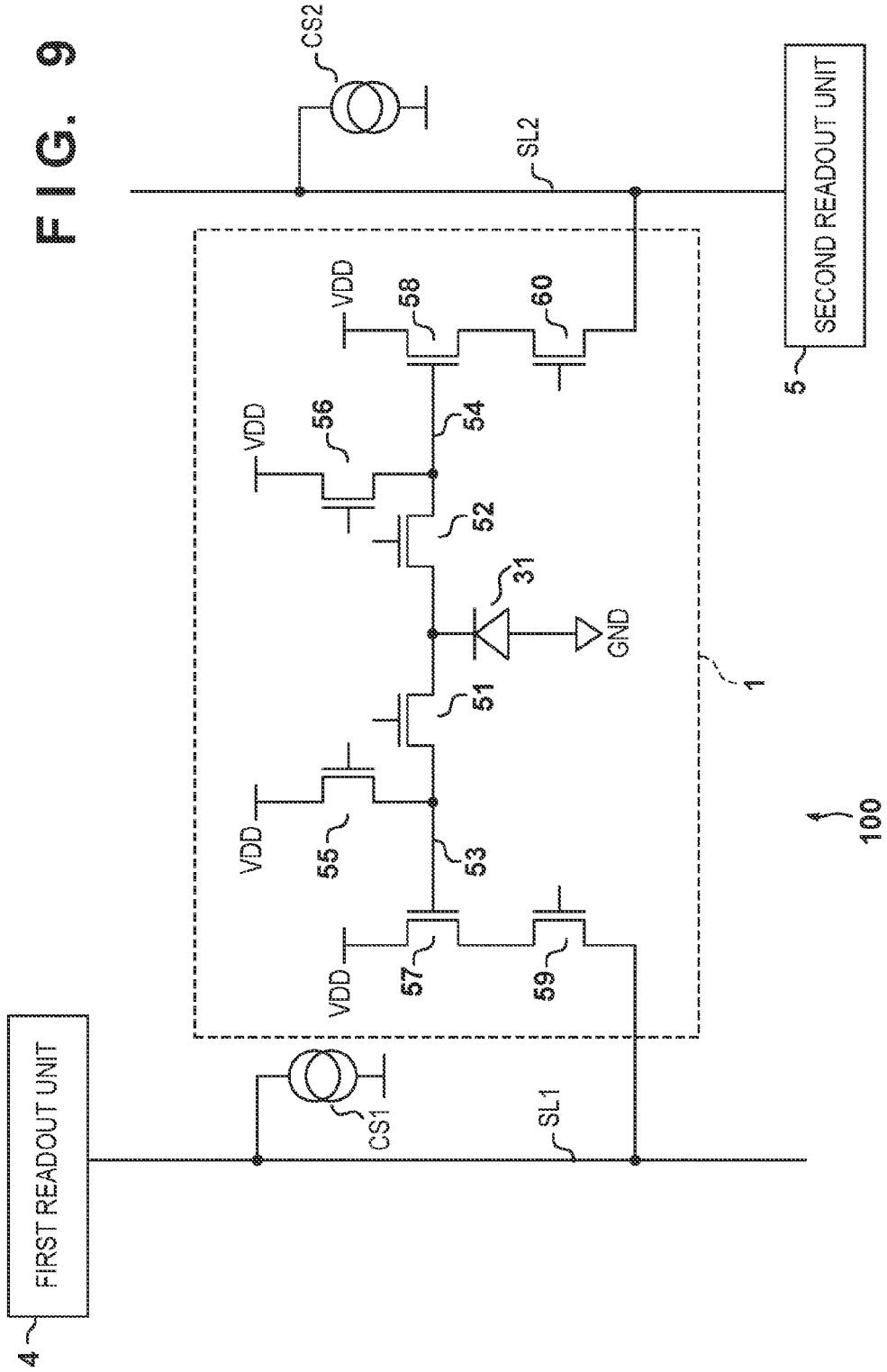
FIG. 9 is a view showing the third modification of the solid-state image sensor according to the second embodiment of the present invention.

FIG. 9 shows the arrangement of the third modification of the solid-state image sensor 100 according to the second embodiment of the present invention. Matters not mentioned in the third embodiment can comply with the first embodiment or the second embodiment shown in FIG. 5 which partly incorporates the first embodiment. Descriptions of parts in common with the first embodiment are omitted in FIG. 9.

Each pixel 1 includes the photoelectric converter 31, FDs 53 and 54, transfer transistors 51 and 52, reset transistors 55 and 56, amplification transistors 57 and 58, and selection transistors 59 and 60. The charges accumulated in the photoelectric converter 31 are transferred to the FD 53 by turning on the transfer transistor 51. A signal according to these charges is output to the signal line SL1 via the amplification transistor 57 and the selection transistor 59 and is read out by the first readout unit 4. The charges accumulated in the photoelectric converter 31 are transferred to the FD 54 by turning on the transfer transistor 52. A signal according to these charges is output to the signal line SL2 via the amplification transistor 58 and the selection transistor 59 and is read out by the second readout unit 5. That is, each output from the amplification transistors 57 and 58 is supplied to a corresponding readout unit out of the plurality of readout units.

Figure 10:
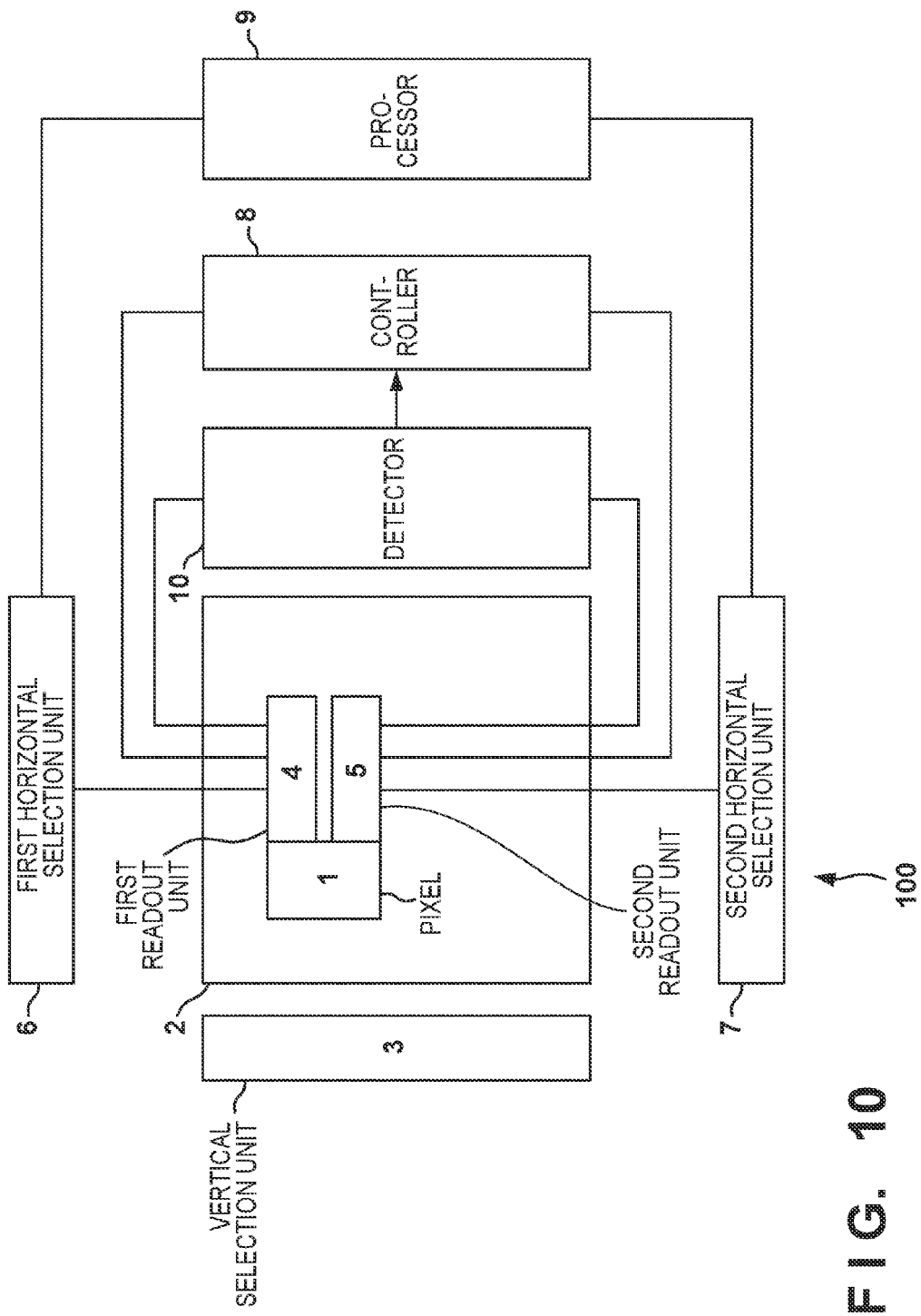
FIG. 10 is a view showing the arrangement of a solid-state image sensor according to the third embodiment of the present invention.

FIG. 10 shows the arrangement of a solid-state image sensor 100 according to the third embodiment of the present invention. Matters not mentioned in the third embodiment can comply with the first embodiment. In the third embodiment, one pair of a first readout unit 4 and a second readout unit 5 as a plurality of readout units is provided for one pixel 1. A pair of the first readout unit 4 and the second readout unit 5 as the plurality of readout units is provided for each pixel of the plurality of pixels 1. Components of the solid-state image sensor 100 such as an image sensing unit 2, the first readout unit 4 and the second readout unit 5 as the plurality of readout units provided for each pixel 1, a detector 10 and a controller 8 are arranged on a single semiconductor substrate 201. Additionally, the first readout unit 4 and the second readout unit 5 as the plurality of readout units are arranged in respective wells electrically isolated from each other in the semiconductor substrate 201. The third embodiment is advantageous for a solid-state image sensor 100 that has large-sized pixels 1.

Figure 11:
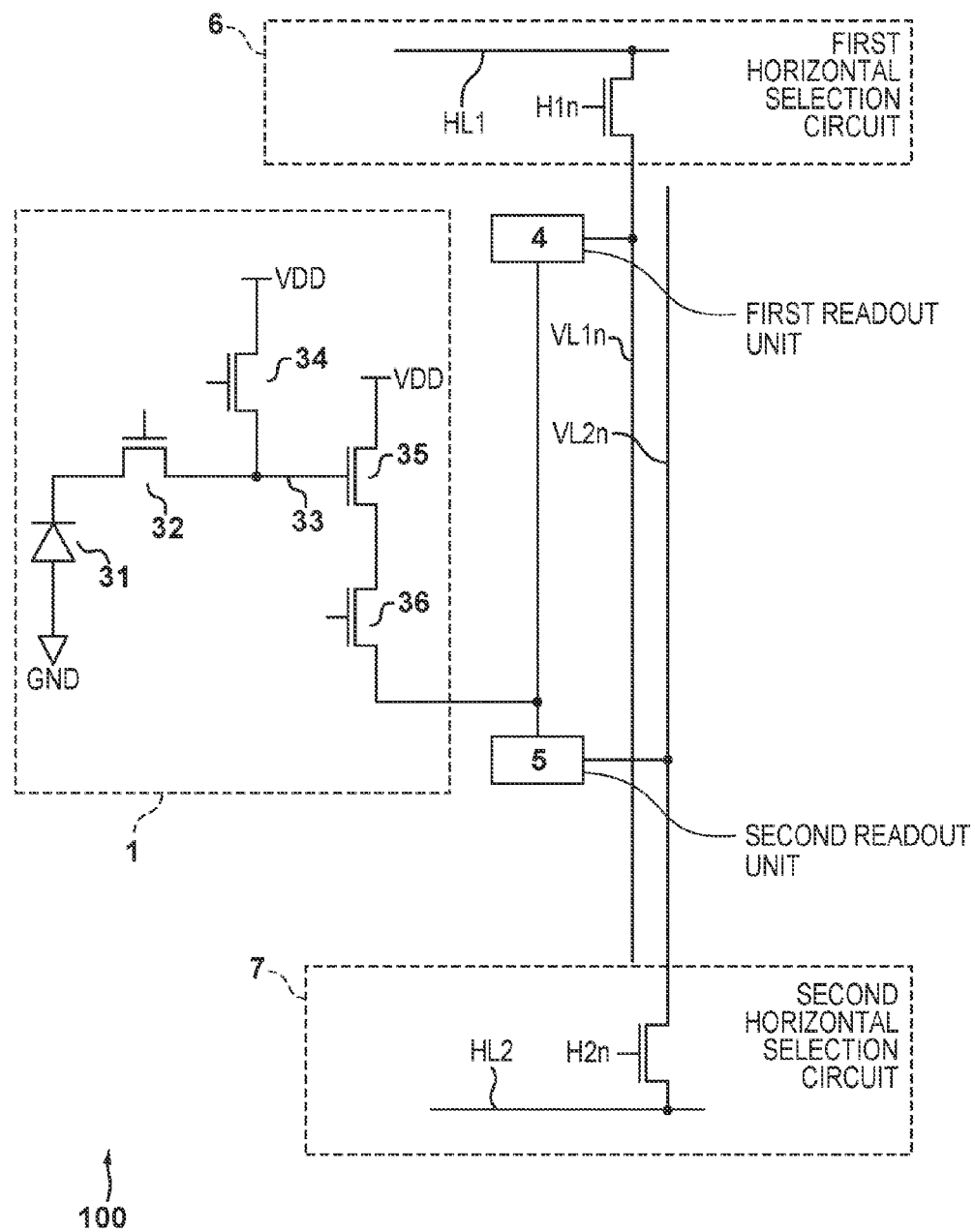
FIG. 11 is a view showing an example of the specific arrangement of the solid-state image sensor according to the third embodiment.

FIG. 11 shows a more detailed arrangement of the arrangement described in FIG. 10. A signal read out by the first readout unit 4 of the pixel 1 of the nth row is transferred to a first horizontal selection unit 6 via a first vertical transfer line VL1n of the nth row and supplied to a processor 9 via a selection switch H1n of the nth row and the first horizontal transfer line HL1. A signal read out by the second readout unit 5 of the pixel 1 of the nth row is transferred to a second horizontal selection unit 7 via a second vertical transfer line VL2n of the nth row and supplied to the processor 9 via a selection switch H2n of the nth row and a second horizontal transfer line HL2.

As an application example of the solid-state image sensor according to each of the above-described embodiments, a camera incorporating the solid-state image sensor will be explained below. The concept of the camera includes not only an apparatus whose main purpose is imaging, but also an apparatus (for example, a personal computer or portable terminal) having an imaging function as an auxiliary function. The camera can include the solid-state image sensor according to the present invention exemplified in the above-described embodiments, and a signal processor that processes an output signal from the solid-state image sensor. This signal processor can include an A/D converter, and a processor that processes digital data output from the A/D converter.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-069808, filed Mar. 30, 2015, which is hereby incorporated by reference herein in its entirety.

What is claimed is:

1. A solid-state image sensor that includes an image sensing unit in which a plurality of pixels are arrayed, the sensor comprising:
a plurality of readout units configured to read out signals from the image sensing unit;
a detector configured to detect an occurrence of a latch-up in each of the plurality of readout units; and
a controller configured to control power supply to the plurality of readout units,
wherein the plurality of readout units are configured to read out signals from a same pixel in the image sensing unit, and
the controller is configured to shut off power supply to at least part of a readout unit in which the occurrence of the latch-up has been detected out of the plurality of readout units and thereafter supply power to the at least part of the readout circuit.

2. The sensor according to claim 1, further comprising:
a processor configured to output, as a signal read out from the image sensing unit, a signal according to a signal read out by a readout unit, out of the plurality of readout units, different from the readout unit in which the occurrence of the latch-up is detected by the detector.

3. The sensor according to claim 1, further comprising a plurality of signal lines, wherein a signal of selected one of pixels, belonging to one column, out of the plurality of pixels is output to a signal line corresponding to the column out of the plurality of signal lines, and the plurality of signal lines are connected to the respective plurality of readout units.

4. The sensor according to claim 3, wherein a switch is provided between each of the plurality of signal lines and each of the plurality of readout units.

5. The sensor according to claim 4, wherein the plurality of readout units include a first readout unit and a second readout unit, and
the image sensing unit is arranged between the first readout unit and the second readout unit.

6. The sensor according to claim 5, wherein the image sensing unit, the plurality of readout units, the detector, and the controller are arranged on a semiconductor substrate, and the plurality of readout units are arranged in respective wells which are electrically isolated from each other in the semiconductor substrate.

7. The sensor according to claim 6, wherein the detector detects the occurrence of the latch-up based on a current supplied to each of the wells which are electrically isolated from each other and in which the respective plurality of readout units are arranged.

8. The sensor according to claim 1, wherein each pixel includes a photoelectric converter and a plurality of amplification transistors each outputting a signal according to charges generated by the photoelectric converter, and an output from each amplification transistor is supplied to a corresponding readout unit out of the plurality of readout units.

9. The sensor according to claim 1, wherein each pixel includes a photoelectric converter, a plurality of amplification transistors, and a plurality of transfer transistors each provided between a photoelectric converter and an input node of each of the plurality of amplification transistors, and an output from each amplification transistor is supplied to a corresponding readout unit out of the plurality of readout units.

10. The sensor according to claim 1, wherein the plurality of readout units include a first readout unit arranged on one side of the image sensing unit and a second readout unit arranged on the other side of the image sensing unit.

11. The sensor according to claim 1, wherein the plurality of readout units include a first readout unit and a second readout unit, and
the image sensing unit is arranged between the first readout unit and the second readout unit.

12. The sensor according to claim 1, wherein one pair of the plurality of readout units is provided for one pixel, and a plurality of the pairs are provided to correspond to the respective plurality of pixels.

13. The sensor according to claim 1, wherein the image sensing unit, the plurality of readout units, the detector and the controller are arranged in a semiconductor substrate, and the plurality of readout units are arranged on respective wells which are electrically isolated from each other in the semiconductor substrate.

14. The sensor according to claim 13, wherein the detector detects the occurrence of the latch-up based on a current supplied to each of the wells electrically which are isolated from each other and in which the respective plurality of readout units are arranged.

15. The sensor according to claim 14, wherein the wells include an n-well to which a power supply voltage is supplied and a p-well to which a ground voltage is supplied, and
the detector detects the occurrence of the latch-up based on a current flowing from the power supply voltage to the n-well.

16. The sensor according to claim 1, wherein the controller is configured to supply, while power supply to the at least part of the readout unit is shut off, power to a readout unit, out of the plurality of readout units, different from the readout unit in which the occurrence of the latch-up is detected by the detector.

17. The sensor according to claim 1, wherein each of the plurality of readout units includes an analog/digital converter configured to convert an analog signal from the image sensing unit into a digital signal.

18. The sensor according to claim 17, wherein each of the plurality of readout units includes an amplifier configured to amplify the analog signal from the image sensing unit and output the amplified signal to the analog/digital converter, and
the controller is configured to shut off power supply to the analog/digital converter in which the occurrence of the latch-up is detected while supplying power to the amplifier of the readout unit to which the analog/digital converter in which the occurrence of the latch-up is detected belongs and later supply power to the analog/digital converter in which the occurrence of the latch-up is detected.

19. A camera comprising:
a solid-state image sensor; and
a signal processor configured to process a signal output from the solid-state image sensor,
wherein the solid-state image sensor includes:
an image sensing unit in which a plurality of pixels are arrayed;
a plurality of readout units configured to read out signals from the image sensing unit;
a detector configured to detect an occurrence of a latch-up in each of the plurality of readout units; and
a controller configured to control power supply to the plurality of readout units,
wherein the plurality of readout units are configured to read out signals from a same pixel in the image sensing unit, and
the controller is configured to shut off power supply to at least part of a readout unit in which the occurrence of the latch-up has been detected out of the plurality of readout units and thereafter supply power to the at least part of the readout unit.

* * * * *